G. C. HICKS, Jr.
PUMP.
APPLICATION FILED APR. 29, 1918.
1,303,795.
Patented May 13, 1919.
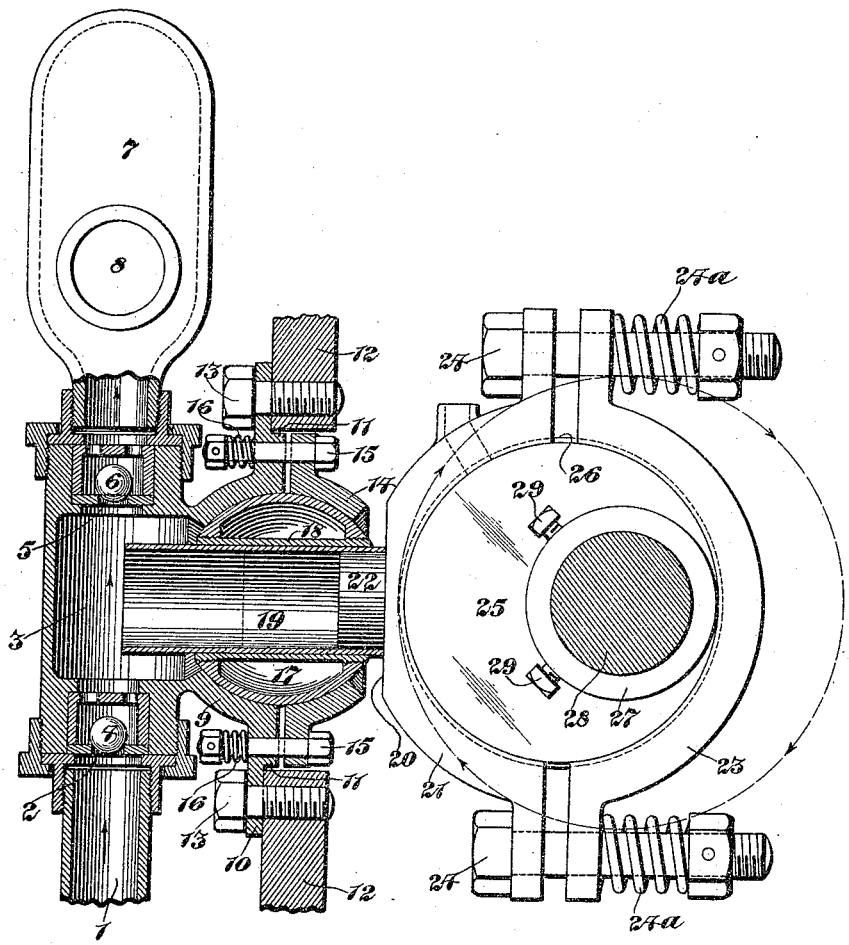
WITNESS.
Charles A. Becker.
INVENTOR.
George C. Hicks, Jr.,
BY Small & Small
HIS ATTORNEYS.

UNITED STATES PATENT OFFICE.

GEORGE C. HICKS, JR., OF CONNERSVILLE, INDIANA.

PUMP.

1,303,795. Specification of Letters Patent. Patented May 13, 1919.

Application filed April 29, 1918. Serial No. 231,416.

*To all whom it may concern:*

Be it known that I, GEORGE C. HICKS, Jr., a citizen of the United States of America, and a resident of Connersville, in the county of Fayette, State of Indiana, have invented a new and useful Improvement in Pumps, of which the following is a specification.

This invention has for its prime object the provision of a high-speed pump which, while not restricted in its range of application, is particularly adapted for use in connection with the lubrication of automobile engines and comprising a ball-packed piston with means for automatically compensating for the wear occasioned by oscillation of the packing element in response to the various positions assumed by the piston during reciprocation.

Other objects and advantages may be noted on consideration of the following portion of the specification and the appended claims.

The accompanying drawing is a vertical central section of the complete pump, with the eccentric, constituting the operating mechanism, in elevation.

Numeral 1 indicates the pipe leading from the crank case of the engine or other source of oil supply and connected with the intake port 2 which communicates with cylinder 3 and is guarded by a ball check-valve 4 of conventional type. An exhaust port 5 containing a valve of like character 6 serves to admit the contents of said cylinder to reservoir 7 from which it passes through outlet 8 and is conveyed to the engine cylinders (not shown). Extending laterally from cylinder 3 and preferably formed integral therewith is a cup-shaped socket 9 which is provided with an annular flange 10 having a shoulder 11 in its inner face to afford a recess within which the engine case 12 is seated and secured by bolts 13, said socket being joined to the corresponding cup-shaped plate 14 by means of bolts 15 carrying helical expansion springs 16. Within the spherical chamber formed by members 9 and 14 is disposed a metal ball 17 through the center of which is projected a sleeve 18 and extending through said sleeve is a piston 19 which is secured (by brazing or otherwise) to the flattened surface 20 of an eccentric strap 21 and closed adjacent to said strap by plug 22. Strap 21 is connected with its companion strap 23 by spring-pressed bolts 24 and retained within said straps is an eccentric disk 25, the periphery of which is formed with an outstanding rim 26 fitting within a groove or guide-way provided in the inner face of said straps, said disk being rotated by projecting through its eccentrically positioned hub 27 the cam-shaft 28 of the engine (or other driven shaft which may be provided especially for the purpose) which is secured by set-screws 29.

Upon starting the engine, the throw of the eccentric (as indicated in dotted lines) results in imparting reciprocal movement to piston 19 which is shown in the position assumed at the completion of its inner or propulsion stroke. As the alternate upward and downward movement of straps 21 and 23 necessarily occasions a slight tilting of said piston during each revolution of disk 25, it follows that ball 17 constantly oscillates within the socket formed by members 9 and 14 and the wear which results from this action is automatically taken up by the gradual constriction of the interval between said members through the agency of springs 16; so also, the wear occurring between said disk and straps is automatically compensated for by the action of springs 24ª mounted upon bolts 24. Moreover, it should be noted that as plate 14 is self-adjusting it also acts as a relief valve, in case of excess pressure, by allowing ball 17 to lift slightly from socket 9.

Having thus fully described the invention, what I claim as new and desire to secure by Letters-Patent is:—

1. A pump comprising a pair of juxtaposed plates having concave inner surfaces forming, in combination, a spherical socket, an oscillatory ball retained by said socket, a sleeve projected through said ball, a piston disposed within said sleeve, means for reciprocating said piston, and devices for automatically constricting said socket to compensate for the wear occasioned by oscillation of said ball.

2. A pump comprising a pair of juxtaposed plates having concave inner surfaces forming, in combination, a spherical socket, an oscillatory ball retained by said socket, a sleeve projected through said ball, a piston disposed within said sleeve, means for reciprocating said piston, bolts connecting said plates, and expansion springs mounted beneath the head of said bolts for constricting said socket to compensate for the wear occasioned by oscillation of said ball.

3. A pump comprising a pair of juxtaposed plates having concave inner surfaces forming, in combination, a spherical socket, an oscillatory ball retained by said socket, a sleeve projected through said ball, a piston disposed within said sleeve, an eccentric, a strap surrounding said eccentric connected with said piston, and devices for automatically constricting said socket and strap to compensate for wear.

GEORGE C. HICKS, Jr.

Witnesses:
W. C. BARNES,
E. R. BAILEY.